No. 883,733. PATENTED APR. 7, 1908.
E. T. MORRIS.
TOMBSTONE.
APPLICATION FILED APR. 11, 1907.

2 SHEETS—SHEET 1.

Witnesses
Inventor
Emerson T. Morris
By
Attorneys

No. 883,733.
PATENTED APR. 7, 1908.
E. T. MORRIS.
TOMBSTONE.
APPLICATION FILED APR. 11, 1907.
2 SHEETS—SHEET 2.
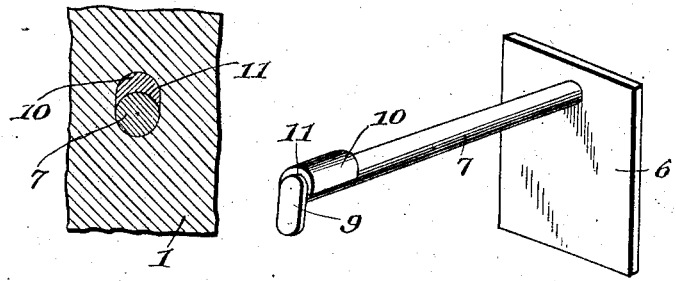
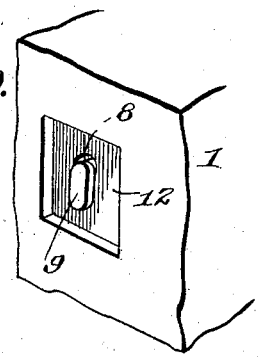
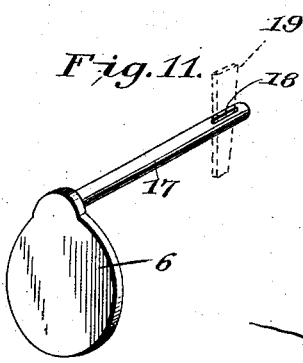
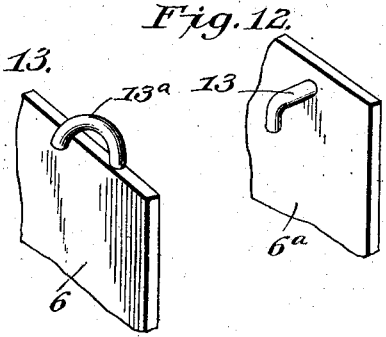
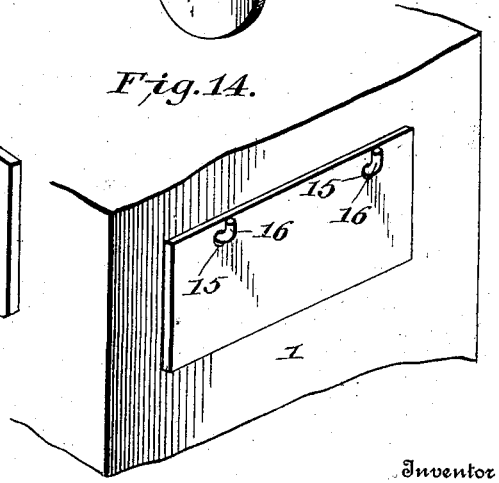
Witnesses
Inventor
Emerson T. Morris
By
Attorneys

UNITED STATES PATENT OFFICE.

EMERSON T. MORRIS, OF DERWENT, OHIO.

TOMBSTONE.

No. 883,733.　　　Specification of Letters Patent.　　　Patented April 7, 1908.

Application filed April 11, 1907. Serial No. 367,719.

*To all whom it may concern:*

Be it known that I, EMERSON T. MORRIS, citizen of the United States, residing at Derwent, in the county of Guernsey and State of Ohio, have invented certain new and useful Improvements in Tombstones, of which the following is a specification.

The present invention relates to certain new and useful improvements in the design of tombstones and monuments, and has for its object to provide a novel form of construction which will enable records, tokens, or the like to be permanently preserved and at the same time held in such a position as to be readily inspected when found desirable.

With this object in view the invention consists essentially in the provision of a tombstone with a chamber or recess, novel means being employed for closing the mouth of the chamber and shielding the interior thereof from the destructive action of the elements.

Figure 1:
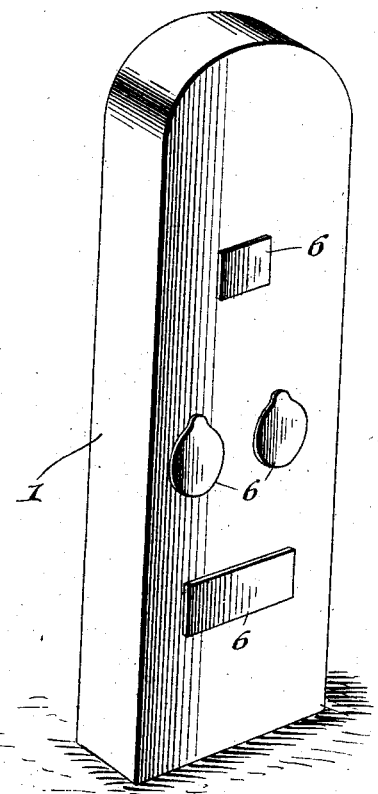
Figure 2:
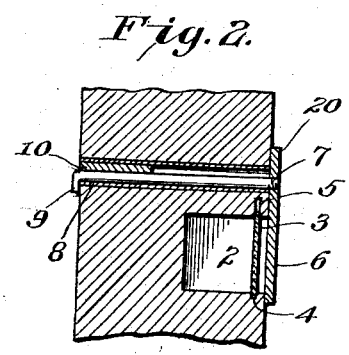
Figure 4:
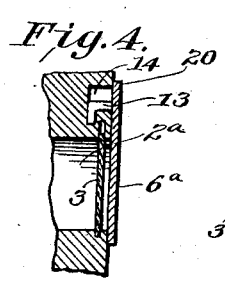
Figures 6, 7:
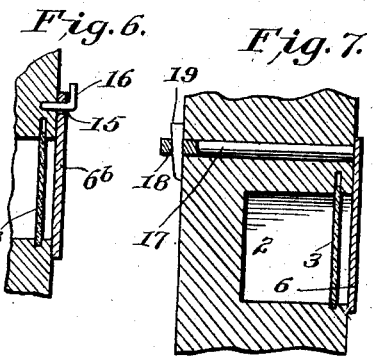
Figure 3:
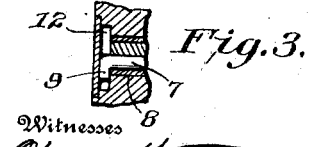
Figure 5:
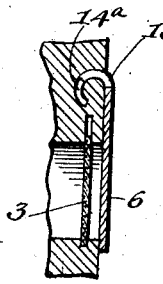

For a full description of the invention and the merits thereof and also to acquire a knowledge of the details of construction and the means for effecting the result, reference is to be had to the following description and accompanying drawings, in which:

Figure 1 is a perspective view showing the application of the invention. Fig. 2 is a longitudinal sectional view through a portion of the tombstone showing one method of mounting the cover. Fig. 3 is a detail view showing a modification. Fig. 4 is a sectional view showing another method of mounting the cover. Fig. 5 is a similar view showing a further modification in the method of mounting the cover. Fig. 6 is a similar view of a further modification. Fig. 7 is a sectional view through a portion of the tombstone and shows still a further method of mounting the cover. Fig. 8 is a detail view of one of the covers. Fig. 9 is a similar view. Fig. 10 is a perspective view of a portion of the rear of the tombstone showing a depression therein to form a clearance space for the lateral arm at the end of the shaft shown in Fig. 8. Fig. 11 is a detail view of one of the swinging covers and the shaft carried thereby. Figs. 12 and 13 are detail views of the hook members employed for mounting the covers in the modifications shown in Figs. 4 and 5 respectively. Fig. 14 is a perspective view of the modification shown in Fig. 6.

Corresponding and like parts are referred to in the following description and indicated in all the views of the drawings by the same reference characters.

In carrying out the invention the monument or tombstone 1 is formed with a recess or chamber 2 in one side thereof, and the said recess may be of any desired shape or configuration. If found desirable these chambers 2 may have the mouths thereof closed by a transparent plate of glass or similar material as indicated at 3 and where rectangular chambers are formed the lower side of the chamber is formed with a groove 4 and the upper side with a groove 5 somewhat deeper than the groove 4, the glass 3 being slipped upwardly into the groove 5 and then let down in the groove 4. Cement of any suitable nature may then be placed around the edges of the glass in such a manner as to produce an air tight seal.

In order to more effectively protect the interior of the chamber 2 an exterior cover may be employed which is movably mounted upon the monument and can be readily manipulated to expose the chamber when desired. One method of mounting the cover is shown in Fig. 2 in which the cover 6 is formed with a laterally extending shaft 7 designed to extend through an opening 8 formed in the monument 1 immediately above the chamber 2. This opening 8 extends entirely through the monument and the end portion of the shaft 7 is formed with a laterally extending arm 9 which is adapted to coöperate with a removable plug 10 to hold the cover 6 in position and at the same time permit the same to be readily swung to one side for the purpose of exposing the chamber. The diameter of the opening 8 is sufficiently great to permit the shaft 7 with its arm 9 to slide freely therein, and after the shaft 7 has been placed in position the plug 10 is inserted in the rear end of the opening. This plug 10 corresponds in shape to the said opening 8 and is formed with a cutaway portion 11 loosely receiving the shaft 7 in order that the latter may rotate freely when the cover 6 is swung to one side. If found desirable a depression 12 may be formed in the rear face of the monument at the termination of the opening 8 for the reception of the arm 9, and this depression is of a suitable size to form a clearance space for the arm and permit the required movement of the same as the shaft 7 rotates. This depression 12 may be made sufficiently deep to permit the mouth thereof to be closed in any desired manner, thereby effectively concealing the rear end of the opening 8 and imparting a uniform appearance to the rear face of the monument.

Another method of mounting the covers is shown in Fig. 4 in which the cover 6ª is formed with the hooked arms 13 which are received by depressions 14 formed in the face of the monument immediately above the chamber 2ª therein. The hooked formation of the arms 13 coöperates with the depressions 14 to prevent accidental displacement of the cover 6ª, but at the same time permits the same to be readily removed from the monument when desired. A slight modification of this construction is shown in Fig. 5 in which the hooked arms 13ª projecting from the cover have a curved formation and engage the depressions 14ª in such a manner as to admit of the cover having a swinging movement.

Still another method of mounting the covers is shown in Fig. 6, in which the covers 6ᵇ are provided with openings 15 engaging studs 16 projecting from the face of the monument immediately above the chamber. These studs 16 preferably have the extremities thereof turned upwardly whereby a hooked formation is produced and may be formed of any durable material such as porcelain or the like.

If found desirable the covers may be provided with arms 17 having key receiving openings 18 formed therein and designed to coöperate with suitable keys 19 to lock the cover normally in a closed position. It may also be stated that where the shafts 7 are employed in the mounting of the covers 6 the said covers are preferably formed with flanges 20 which extend upwardly and conceal the mouth of the opening 8.

Having thus described the invention, what is claimed as new is:

1. The combination of a tombstone having a chamber formed therein, the lower portion of the mouth of the chamber being provided with a groove, and the upper portion of the chamber being formed with a corresponding groove of greater depth, a transparent plate designed to be slipped in the upper groove and let fall into the lower groove, and a cover loosely mounted upon the tombstone and normally closing the mouth of the chamber.

2. The combination of a tombstone having a chamber formed therein and also formed with a transverse opening extending entirely through the tombstone, and a cover for closing the mouth of the chamber, the said cover carrying a shaft extending through the opening and the end of the shaft being provided with means for preventing its withdrawal from the opening.

3. The combination of a tombstone having a chamber formed therein and also provided with a transverse opening extending entirely through the tombstone immediately above the chamber, and a cover for the chamber carrying a shaft extending through the opening, the extremity of the shaft being formed with a laterally extending arm for preventing the withdrawal of the shaft from the opening.

4. The combination of a tombstone provided with a chamber and also having a lateral opening formed therein extending entirely through the tombstone, a cover carrying a shaft received by the opening, the end portion of the shaft being formed with a lateral arm, and a plug fitting within the opening and coöperating with the lateral arm to prevent the withdrawal of the shaft from the opening.

In testimony whereof I affix my signature in presence of two witnesses.

EMERSON T. MORRIS. [L. S.]

Witnesses:
   N. K. DEVORE,
   M. C. GREGG.